(12) United States Patent
Ma et al.

(10) Patent No.: US 10,627,893 B2
(45) Date of Patent: *Apr. 21, 2020

(54) HSIC COMMUNICATION SYSTEM AND METHOD

(71) Applicant: Samsung Electronics Co., Ltd., Suwon-si, Gyeonggi-do (KR)

(72) Inventors: Dong Chul Ma, Osan-si (KR); Dae Kyung Kim, Suwon-si (KR); Joon Young Shim, Seoul (KR); Ho Kyu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/017,229

(22) Filed: Jun. 25, 2018

(65) Prior Publication Data
US 2018/0307298 A1    Oct. 25, 2018

Related U.S. Application Data

(63) Continuation of application No. 14/592,287, filed on Jan. 8, 2015, now Pat. No. 10,007,327, which is a (Continued)

(30) Foreign Application Priority Data

Mar. 23, 2011    (KR) .................. 10-2011-0025665

(51) Int. Cl.
*G06F 1/32* (2019.01)
*G06F 1/3293* (2019.01)
*G06F 1/3203* (2019.01)
*G06F 1/3228* (2019.01)
*G06F 1/3287* (2019.01)
*G06F 1/3234* (2019.01)

(52) U.S. Cl.
CPC .......... *G06F 1/3293* (2013.01); *G06F 1/3203* (2013.01); *G06F 1/3228* (2013.01); *G06F 1/3253* (2013.01); *G06F 1/3287* (2013.01); *Y02D 10/171* (2018.01); *Y02D 50/20* (2018.01)

(58) Field of Classification Search
CPC .... G06F 1/3293; G06F 1/3203; G06F 1/3228; G06F 1/3253; G06F 1/3287
See application file for complete search history.

(56) References Cited

U.S. PATENT DOCUMENTS

7,409,567 B2    8/2008   Hammes et al.
7,738,482 B2    6/2010   Thousand et al.
(Continued)

*Primary Examiner* — Stefan Stoynov
(74) *Attorney, Agent, or Firm* — Jefferson IP Law, LLP (57) ABSTRACT

A High Speed Inter Chip (HSIC) system and method for minimizing power consumption by controlling the state of the HSIC module through a control line are provided. The method between a host and a slave includes transitioning, when no communication request exists for a first reference time in an active state where all functions of the HSIC modules are enabled, to a suspend state where least functions used for maintaining a communication link of the HSIC modules and transitioning, when no communication request exists for a second reference time in the suspend state, to a power-off state where the HSIC modules turn off. The HSIC communication method and apparatus are advantageous to minimize the electric current consumption of the HSIC consumption system.

20 Claims, 6 Drawing Sheets

Related U.S. Application Data continuation of application No. 13/428,298, filed on Mar. 23, 2012, now Pat. No. 8,949,644.

(56) References Cited

U.S. PATENT DOCUMENTS

| | | |
|---|---|---|
| 7,809,969 B2 | 10/2010 | Das Sharma et al. |
| 7,900,070 B2 | 3/2011 | Wu et al. |
| 2011/0110256 A1 | 5/2011 | Han et al. |
| 2012/0159218 A1 | 6/2012 | Vangala et al. |

HSIC COMMUNICATION SYSTEM AND METHOD

PRIORITY

This application is a continuation application of prior application Ser. No. 14/592,287, filed on Jan. 8, 2015, which has issued as U.S. Pat. No. 10,007,327 on Jun. 26, 2018, which is a continuation application of a prior application Ser. No. 13/428,298, filed on Mar. 23, 2012, which was issued as U.S. Pat. No. 8,949,644 on Feb. 3, 2015 and was based on and claimed priority under 35 U.S.C. § 119(a) of a Korean patent application filed on Mar. 23, 2011 in the Korean Intellectual Property Office and assigned Serial number 10-2011-0025665, the entire disclosure of which is hereby incorporated by reference.

BACKGROUND OF THE INVENTION

1. Field of the Invention

The present invention relates to a High Speed Inter Chip (HSIC) communication system and method. More particularly, the present invention relates to an HSIC system and method that is capable of minimizing power consumption by controlling the state of the HSIC module through a control line.

2. Description of the Related Art

With the advancement of information communication and semiconductor technologies, the popularity and use of mobile terminals have increased rapidly. More particularly, the latest mobile terminals have evolved to an extent where it is possible to support the mobile convergence blending various communication capabilities into a single logical set of services. More specifically, the latest mobile communication terminals are configured to support various supplementary functions, such as a broadcast playback function (e.g., Digital Multimedia Broadcasting (DMB) and Digital Video Broadcasting (DVB)), an audio playback function (e.g., a Motion Pictures Expert Group (MPEG-1 or MPEG-2) Audio Layer-3 (MP3), a photographing function, a data communication function, and Internet access functions, as well as voice communication and messaging functions of the related art.

In order to support the diverse functions, it has become normal for mobile communication terminals to be equipped with multiple chips. Typically, the communication between the chips is implemented by means of a memory (e.g., a Dual Ported Random Access Memory (DPRAM) and ONE Dynamic RAM (ONEDRAM)) or a serial interface (e.g., a Service Provider Interface (SPI), a Secure Digital Input Output (SDIO), a Mobile Industry Processor Interface (MIPI), a Host Integration Server (HIS), and the like). More recently, the latest mobile terminals adopt a High Speed Inter Chip (HSIC) interface for high data rate in inter-chip communication. HSIC is based on Universal Serial Bus (USB) technology and supports a data rate up to 480 Mbps. However, the USB technology-based HSIC has a drawback of high electric current consumption. Accordingly, the mobile terminal equipped with the HSIC consumes battery resources at a fast rate.

Therefore, a need exists for an HSIC communication system and method that is capable of minimizing electric current consumption by controlling the state of the HSIC module through a control interface.

SUMMARY OF THE INVENTION

Aspects of the present invention are to address at least the above-mentioned problems and/or disadvantages and to provide at least the advantages described below. Accordingly, an aspect of the present invention is to provide a High Speed Inter Chip (HSIC) communication system and method that is capable of minimizing electric current consumption by controlling the state of the HSIC module through a control interface.

Another aspect of the present invention is to provide an HSIC communication system and method that is capable of reducing the rate of battery consumption of the mobile terminal by minimizing the electric current consumption of the HSIC communication system.

In accordance with an aspect of the present invention, an HSIC communication system is provided. The system includes a host including a first HSIC module wherein the host controls, when no communication request exists for a first reference time in an active state where all functions of the first HSIC module are enabled, the first HSIC module to transition to a suspend state where least functions used for maintaining a communication link of the first HSIC module and send a suspend command to the second HSIC module, and transition, when no communication request exists for a second reference time in the suspend state, to a power-off state where the first HSIC module turns off and enable a host active line for controlling turn-on/off of the second HSIC module, and a slave with a second HSIC module wherein the slave controls, when the suspend command is received, the second HSIC module to transition to the suspend state and turns off, when the host active line is enabled, the second HSIC module to transition to the power-off state.

In accordance with another aspect of the present invention, an HSIC communication method between a host and a slave is provided. The method includes transitioning, when no communication request exists for a first reference time in an active state where all functions of the HSIC modules are enabled, to a suspend state where least functions used for maintaining a communication link of the HSIC modules, and transitioning, when no communication request exists for a second reference time in the suspend state, to a power-off state where the HSIC modules turn off.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustrative purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the following description, the term "active state" denotes the state where the High Speed Inter Chip (HSIC) module is activated for communication between chips, the term "suspended state" denotes the state where only the least function for maintaining the communication link of the HSIC is activated, and the term "power-off state" is the state where the power supply to the HSIC is blocked. If data transfer is requested in the power-off state, an initial process should be performed to power on the HSIC module and establish the communication link.

FIGS. 1 through 6B, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
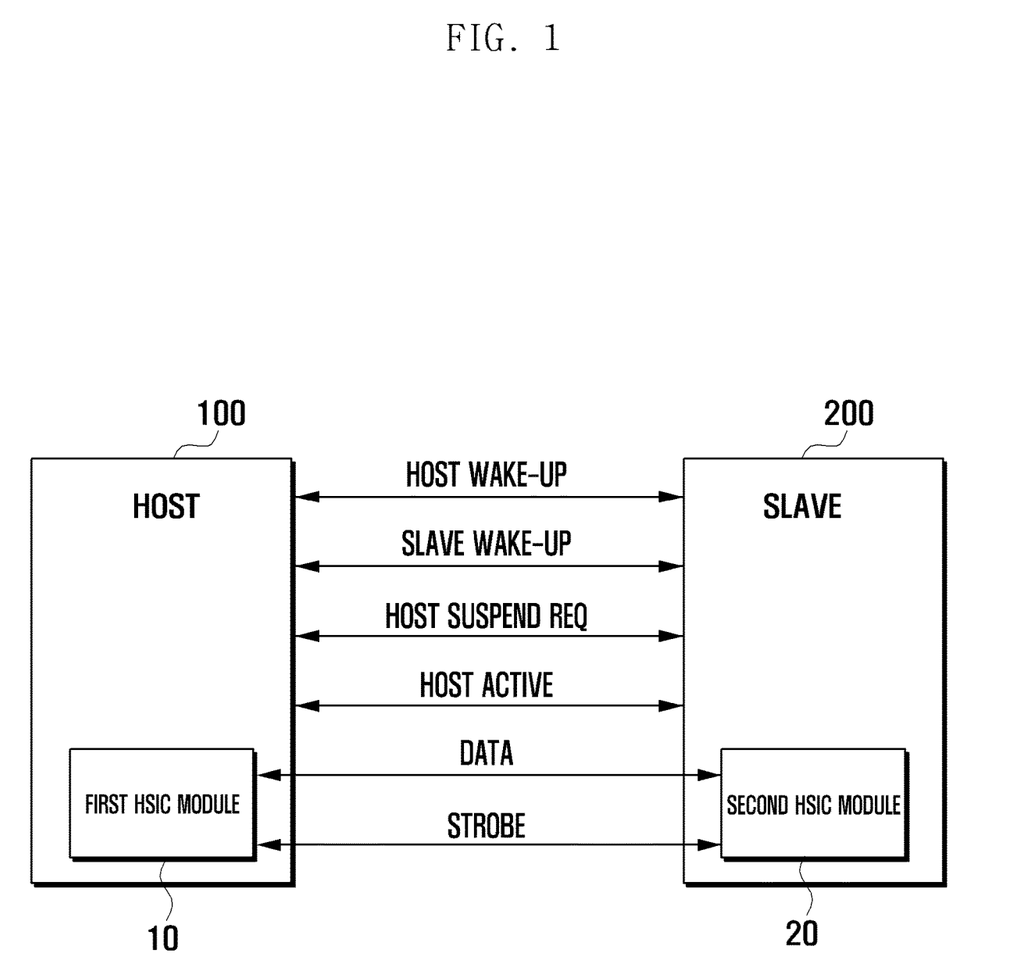
FIG. 1 is a schematic diagram illustrating a configuration of a High Speed Inter Chip (HSIC) communication system according to an exemplary embodiment of the present invention.
Figure 2:
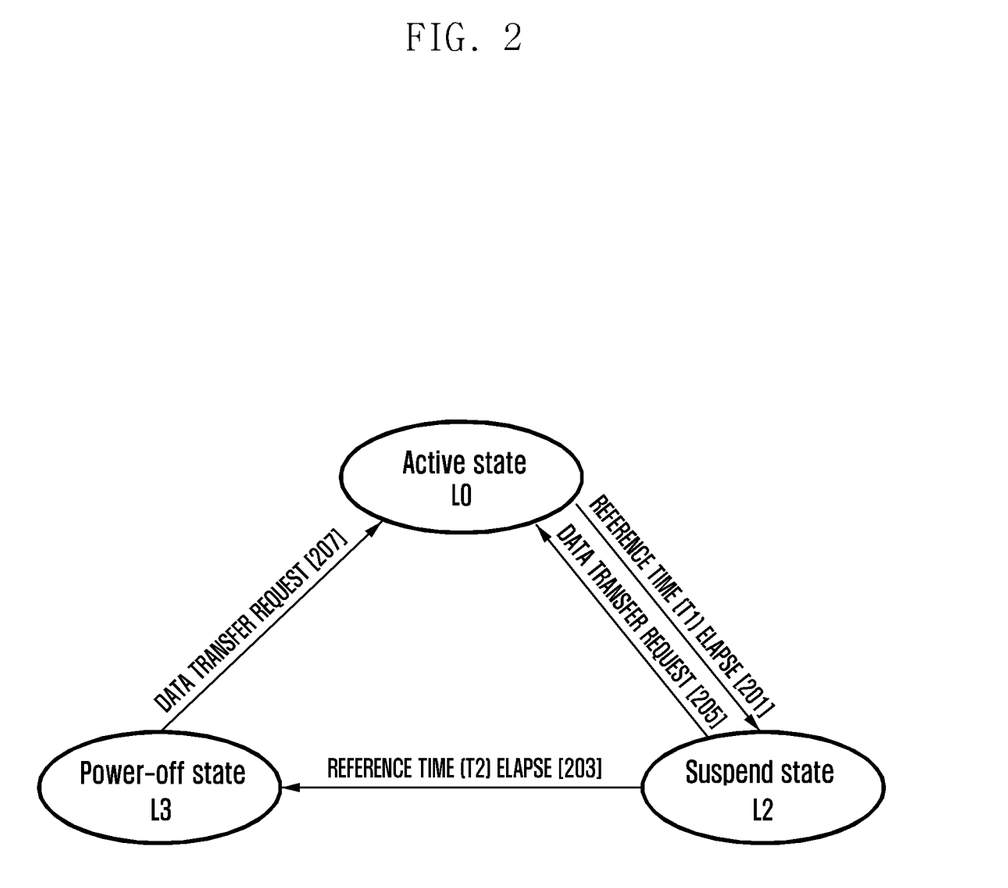
FIG. 2 is a state transition diagram illustrating transition of a state of an HSIC module according to an exemplary embodiment of the present invention.

FIG. 1 is a schematic diagram illustrating a configuration of an HSIC communication system according to an exemplary embodiment of the present invention, and FIG. 2 is a state transition diagram illustrating transition of a state of an HSIC module according to an exemplary embodiment of the present invention.

Referring to FIGS. 1 and 2, the HSIC communication system includes a host 100 and a slave 200. The host 100 includes a first HSIC module 10 for high speed inter-chip communication, and the slave 200 includes a second HSIC module 20.

As aforementioned, the HSIC communication interface is the communication interface based on the Universal Serial Bus (USB) 2.0 standard for high speed data transfer. Recently, HSIC is a promising communication interface due to the advantage of its high speed data rate.

The host 100 is the main chip of the HSIC communication system and can be an Application Processor (AP). The slave is the sub chip of the HSIC communication system and can be a Communication Processor (CP) responsible for processing communication.

The HSIC communication system according to an exemplary embodiment of the present invention can further include a data line (DATA) for data transfer according to the HSIC communication interface standard, a host wake-up line (HOST WAKE-UP) to request activation of the first HSIC module 10 in addition to a strobe line (STROBE), a slave wake-up line (SLAVE WAKE-UP) to request activation of the second HSIC module 20, a host suspend request line (HOST SUSPEND REQ) to request transition to the suspend state, and a host active line (HOST ACTIVE) for controlling power on/off of the second HSIC module 20. These lines are established by connecting the General Purpose Input/Output (GPIO) nodes of the host 100 and slave 200.

The HSIC communication system can control the states of the first HSIC module 10 and the second HSIC module 20 to minimize the power consumption. More specifically, the HSIC communication system can control the first and second HSIC modules 10 and 20 to operate in one of an Active State (L0), a Suspend State (L2), and a Power-off State (L3) as shown in FIG. 2. The active state (L0) is the state where all the functions of the first and second HSIC modules 10 and 20 are activated. The suspend state (L2) is the state where some of the functions of the first and second HSIC modules 10 and 20 reduce power consumption when no data is transmitted while the least functions are activated for maintaining the HSIC communication link. The power-off state (L3) is the state where the power supply to the first and second HSIC modules 10 and 20 is blocked.

Referring to FIG. 2, if no communication request (e.g., a data transfer request) is detected for a predefined first reference time (T1) in the active state (L0), the state of the first and second HSIC modules 10 and 20 can transition from the active state (L0) to the suspend state (L2) as denoted by reference number 201. If no communication request (e.g., data transfer request) is detected for a predefined second time (T2) in the suspend state (L2), the state of the first and second HSIC modules 10 and 20 can transition from the suspend state (L2) to the power-off state (L3) as denoted by reference number 203. If the communication request is detected in the suspend state (L2), the state of the first and second HSIC modules 10 and 20 can transition from the suspend state (L2) to the active state (L0) as denoted by reference number 205. If the communication request is detected in the power-off state (L3), the state of the first and second HSIC modules 10 and 20 can transition from the power-off state to the active state (L0) as denoted by reference number 207. The first and second reference times T1 and T2 can be set to the same value or different values.

In order to transition from the active state (L0) to the power-off state (L3), the state of the first and second HSIC modules 10 and 20 has to transition to the suspend state (L2) first. This is to prevent the data from being lost in the middle of transmission due to the abrupt power-off to the first and second HSIC modules 10 and 20.

Exemplary embodiments of the present invention can be applied to all the types of terminals supporting high data transfer between inner chips. More particularly, exemplary embodiments of the present invention are advantageous to the power-constraint mobile devices, such as a mobile communication terminal, a tablet Personal Computer (PC), a Portable Multimedia Player (PMP), a navigation terminal, a Smartphone, an electronic book, an electronic dictionary, a laptop computer, a netbook, and an Ultra Mobile Personal Computer (UMPC).

The configuration of the HSIC communication system and state transition of the HSIC modules have been described schematically. The state transition of the HSIC module is described below.

Figure 3A:
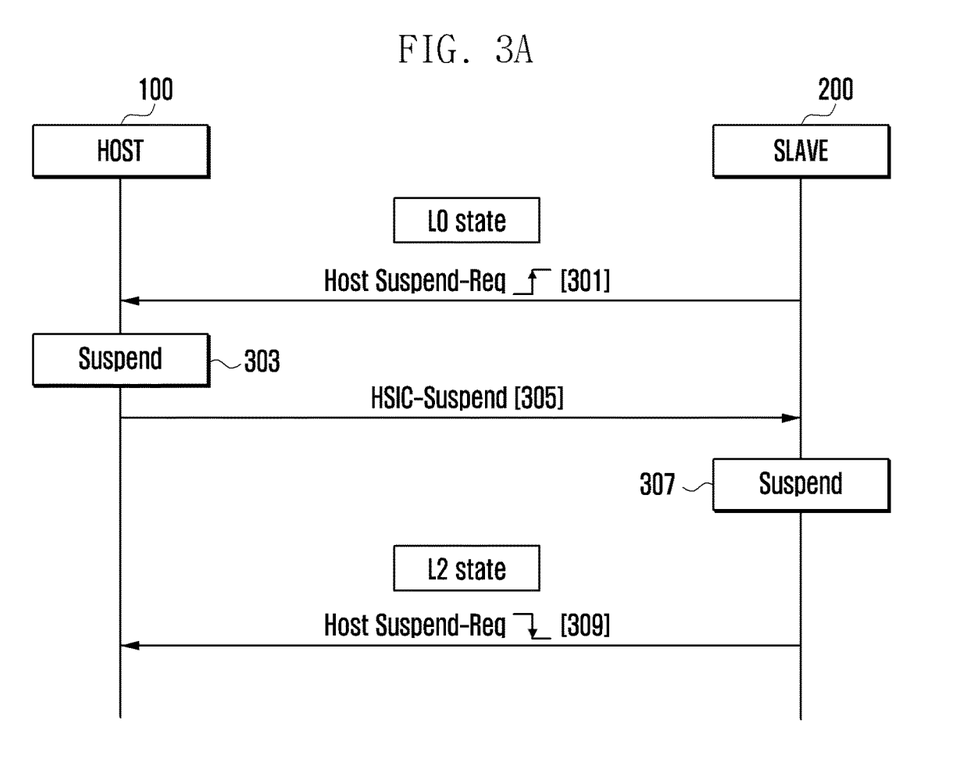
FIGS. 3A and 3B illustrate procedures of state transition of HSIC modules from an active state to a suspend state according to an exemplary embodiment of the present invention.
Figure 3B:
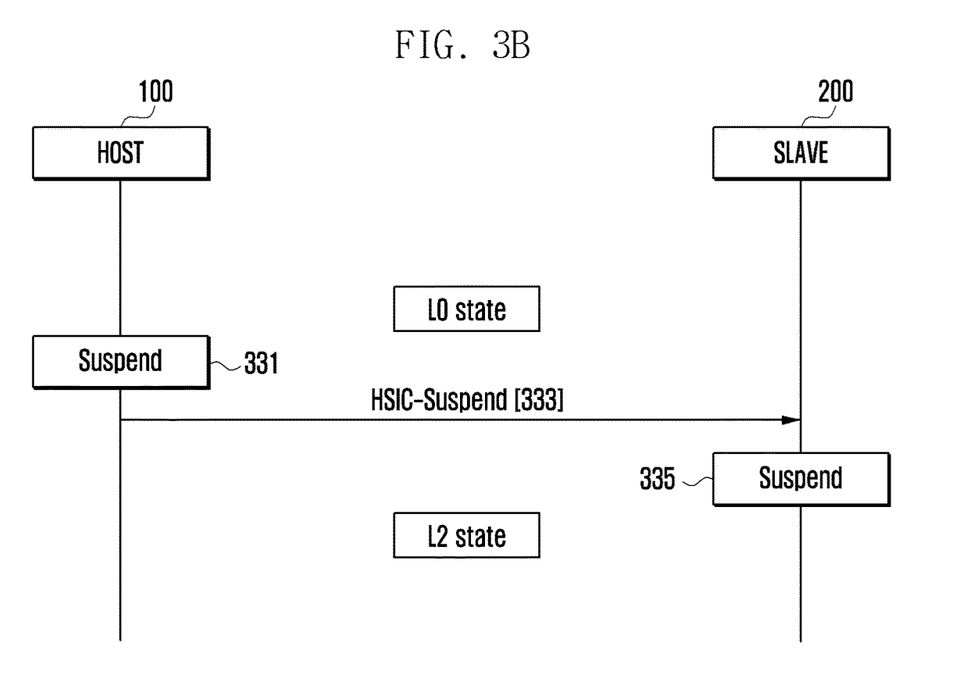

FIGS. 3A and 3B illustrate procedures of state transition of HSIC modules from an active state to a suspend state according to an exemplary embodiment of the present invention.

Referring to FIGS. 1 through 3B, if there is no communication request detected in the active state (L0) for the first reference time, the slave 200 or the host 100 can request transition to the suspend state (L2). FIG. 3A is the signaling diagram illustrating the slave-triggered state transition from the active state to the suspend state, and FIG. 3B is the signaling diagram illustrating the host-triggered state transition from the active state to the suspend state.

Referring to FIG. 3A, if no communication request (e.g., a data transfer request) is detected for the first reference time (T1) after the communication has completed in the active state, the slave 200 of the HSIC communication system can send the host 100 a signal requesting for transition to the suspend state (L2) in step 301. At this time, the slave 200 can enable a host suspend request line (Host-Suspend-Req). Here, to enable means to change the signal from low state to high state on the signal line. If the host suspend request line is enabled, the host 100 controls the first HSIC module 10 to transition from the active state (L0) to the suspend state (L2) in step 303 and send a suspend command (HSIC-Suspend) to the second HSIC module 20 of the slave 200 according to the HSIC communication standard in step 305. More specifically, the first HSIC module 10 switches the data line (DATA) to Low state and the strobe line (STROBE) to High state.

Upon receipt of the HSIC-Suspend, the second HSIC module 200 of the slave transitions to the suspend state (L2) in step 307. Thereafter, the slave 200 sends the host 100 a host suspend request (Host Suspend-Req) to disable the host suspend request line in step 309. In this manner, the state of the first and second HSIC modules 10 and 20 transition from the active state (L0) to the suspend state (L2). As described above, the slave 200 can request the host 100 for the transition to the suspend state (L2) to reduce power consumption of the HSIC communication system.

Referring to FIG. 3B, if no communication request is detected for the first reference time (T1) after the communication has completed in the active state, the host 100 of the HSIC communication system controls the first HSIC module 10 to transition to the suspend state (L2) in step 331 and sends the suspend command (HSIC-Suspend) to the second HSIC module 20 of the slave 200 in step 333. More specifically, the first HSIC module 10 switches the data line (DATA) to Low state and the strobe line (STROBE) to high state.

Upon receipt of the HSIC-Suspend, the second HSIC module 20 of the slave 200 transitions to the suspend state (L2) in step 335. In this manner, the first and second HSIC modules 10 and 20 transition from the active state (L0) to the suspend state (L2).

Figure 4:
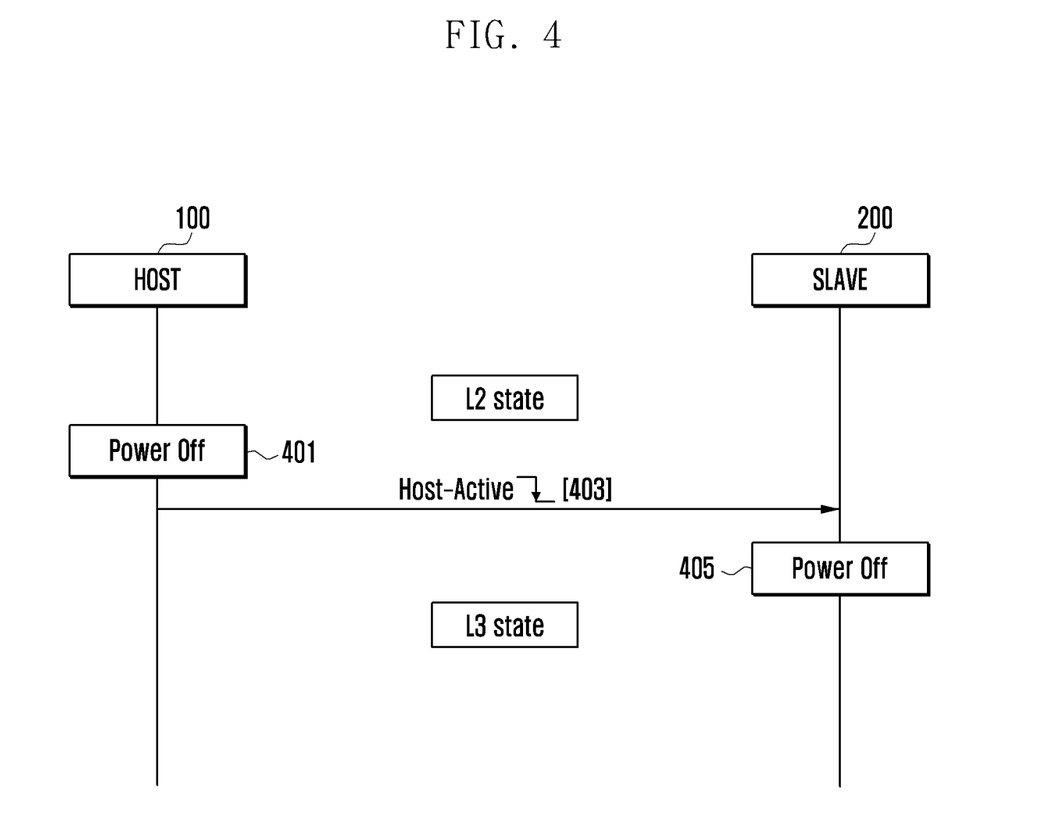
FIG. 4 illustrates procedures of state transition of HSIC modules from a suspend state to a power-off state according to an exemplary embodiment of the present invention.

FIG. 4 illustrates procedures of state transition of HSIC modules from a suspend state to a power-off state according to an exemplary embodiment of the present invention.

Referring to FIGS. 1, 2, and 4, if there is no communication request (e.g., a data transfer request) detected in the suspended state (L2) for the second reference time, the host 100 turns off (or blocks) the power to the first HSIC module 10 to transition to the power-off state (L3) in step 401. Thereafter, the host 100 sends the slave 200 a signal (Host-Active) requesting for transition to the power-off state (L3) in step 403. For this purpose, the host 100 can disable the host active line controlling power on/off of the second HSIC module 20. Upon receipt of the power-off state transition request signal, the slave 200 turns off (or blocks) the power to the second HSIC module 20 to transition to the power-off state (L2) in step 405. In this manner, the first and second HSIC modules 10 and 20 can transition from the suspend state (L2) to the power-off state (L3). Since the first and second HSIC modules 10 and 20 transition to the power-off state when there is no communication between the host 100 and the slave 200, the HSIC communication system is capable of reducing the unnecessary power consumption for maintaining the communication between the host 100 and slave 200.

Figure 5A:
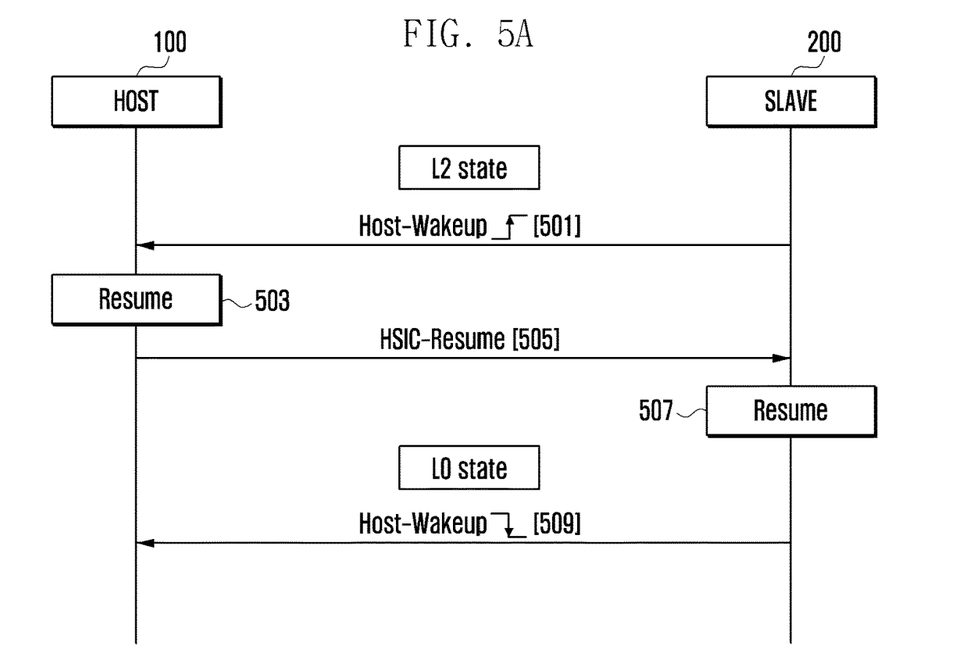
FIGS. 5A and 5B illustrate procedures of state transition of HSIC modules from a suspend state to an active state according to an exemplary embodiment of the present invention.
Figure 5B:
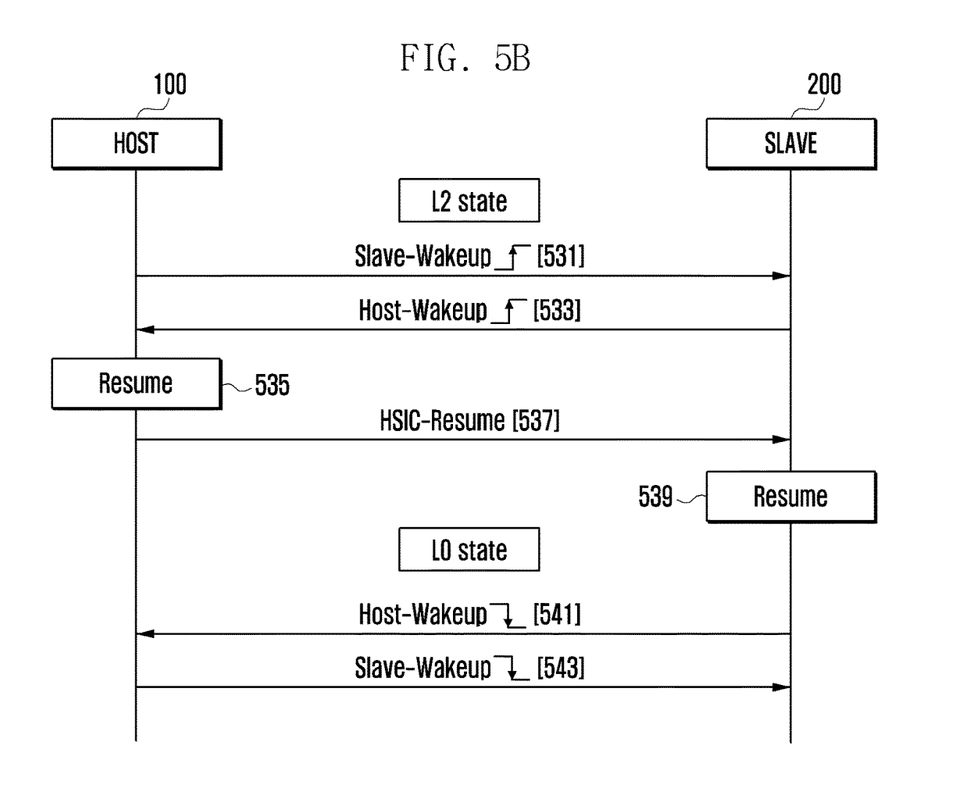

FIGS. 5A and 5B illustrate procedures of state transition of HSIC modules from a suspend state to an active state according to an exemplary embodiment of the present invention.

Referring to FIGS. 1, 2, 5A, and 5B, if a communication request (e.g., a data transfer request) is detected in the host 100 or the slave 200 after the first and second HSIC modules 10 and 20 have transitioned to the suspend module (L2), the host 100 and the slave 200 can control the first and second HSIC modules 10 and 20 to transition to the active state (L0). FIG. 5A is the signaling diagram illustrating the slave-triggered state transition from the suspend state to the active state, and FIG. 5B is the signaling diagram illustrating the host-triggered state transition from the suspend state to the active state.

Referring to FIG. 5A, if a communication request is detected in the suspend state (L2), the slave 200 sends a host wakeup request signal (Host-Wakeup) to the first HSIC module 10 to request activation of the first HSIC module 10 in step 501. For this purpose, the slave 200 can enable the host wakeup line (Host-Wakeup). Upon receipt of the host wakeup request signal, the host 100 resumes the suspended functions of the first HSIC module 10 to transition the first HSIC module 10 from the suspended state (L2) to the active state (L0) in step 503 and sends a function resume request command (HSIC-Resume) to the second HSIC module 20 of the slave 200 according to the HSIC communication standard in step 505. More specifically, the first HSIC module 10 switches the data line (DATA) to High state and the strobe line (STROBE) to Low state.

Upon receipt of the communication resume command, the second HSIC module 20 of the slave 200 resumes its suspended functions to transition to the active state (L0) in step 507. After the second HSIC module 20 has transitioned to the active state (L0), the slave 200 can disable the host wake up line (Host-Wakeup) in step 509. Once both the first and second HSIC modules 10 and 20 transition to the active state (L0), the slave 200 transmits the requested data to the host 100 by means of the second HSIC module 20.

Referring to FIG. 5B, if a communication request is detected in the suspend state (L2), the host 100 sends a slave wakeup request signal (Slave-Wakeup) to the slave 200 to request activation of the second HSIC module 20 in step 531. For this purpose, the host 100 can enable the slave wakeup line (Slave-Wakeup). Upon receipt of the slave wakeup request signal, the slave 200 sends the host 100 a host resume request signal to request activation of the first HSIC module 10 in step 533. For this purpose, the slave 200 can enable the host wakeup line (Host-Wakeup). Upon receipt of the host wakeup request signal, the host 100 controls the first HSIC module 10 to resume its suspended functions to transition from the suspend state (L2) to the active state (L0) in step 535 and send a communication resume command (HSIC-Resume) to the second HSIC module 20 of the slave 200 in step 537.

Upon receipt of the communication resume command, the second HSIC module 20 resumes its suspended functions to transition from the suspend state (L2) to the active state (L0) in step 539. After the second HSIC module 20 has transitioned to the active state (L0), the slave 200 can disable the host wakeup line (Host-Wakeup) in step 541. The host 100 can also disable the slave wakeup line (Slave-Wakeup) in step 543. Once both the first and second HSIC modules 10 and 20 transition to the active state (L0), the host 100 can transmit the request data to the slave 200 by means of the first HSIC module 10.

Figure 6A:
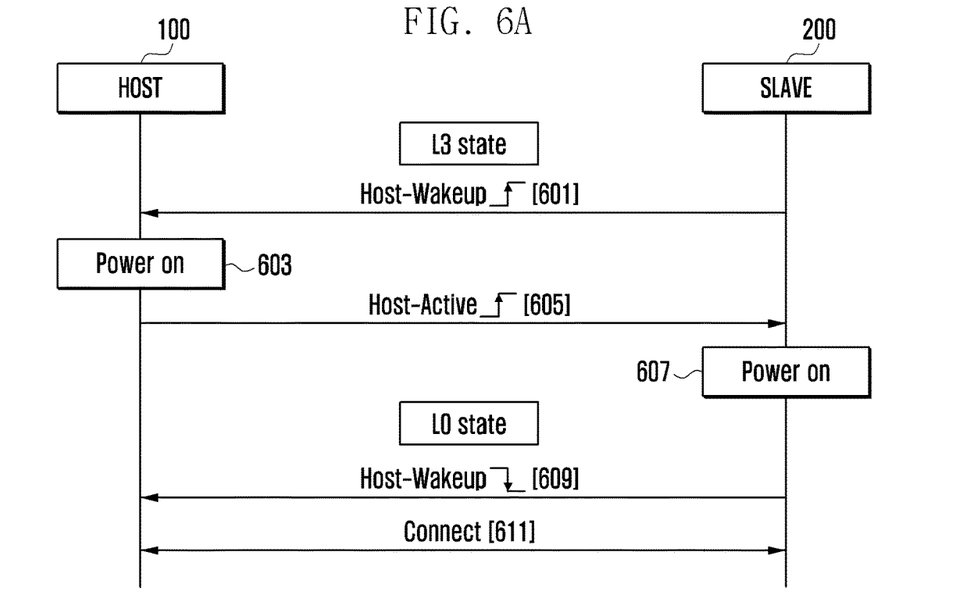
FIGS. 6A and 6B illustrate procedures of state transition of HSIC modules from a power-off state to an active state according to an exemplary embodiment of the present invention.
Figure 6B:
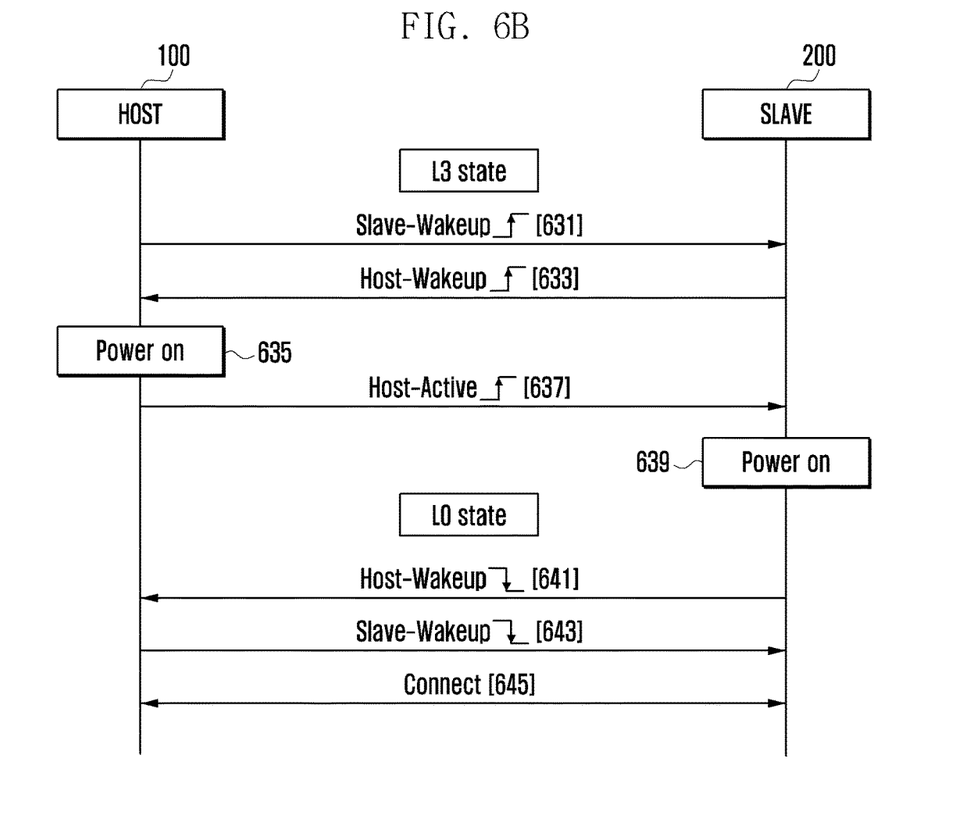

FIGS. 6A and 6B illustrate procedures of state transition of HSIC modules from a power-off state to an active state according to an exemplary embodiment of the present invention.

Referring to FIGS. 1, 2, 6A, and 6B, if a communication request is detected in the host 100 or the slave 200 while the first and second HSIC modules 10 and 20 are in the power-off state (L3), the host 100 and the slave 200 can control the first and second HSIC modules 10 and 20 to transition to the active state (L0). FIG. 6A is the signaling diagram illustrating the slave-triggered state transition from the power-off state to the active state, and FIG. 6B is the signaling diagram illustrating the host-triggered state transition from the power-off state to the active state.

Referring to FIG. 6A, if the communication request is detected in the power-off state (L3), the slave 200 sends a HSIC module activation request signal (Host-Wakeup) to the host 100 in step 601. For this purpose, the slave 200 can enable the host wakeup line (Host-Wakeup). Upon receipt of the HSIC module activation request signal, the host 100 turns on the power of the first HSIC module 10 to transition from the power-off state (L3) to the active state (L0) in step 603 and sends an HSIC module power-on request signal to the slave 200 in step 605. For this purpose, the host 100 can enable the host active line (Host-Active).

Upon receipt of the HSIC module power-on request signal, the slave 200 turns on the second HSIC module 20 to transition from the power-off state (L3) to the active state (L0) in step 607. Once the second HSIC module 20 enters the active state (L0), the slave 200 can disable the host wakeup line (Host-Wakeup) in step 609. After transitioning to the active state (L0), the first and second HSIC modules 10 and 20 perform the initialization process to establish the communication link according to the HSIC communication standard in step 611. Since the initialization procedure is specified in the HSIC communication standard, detailed description thereon is omitted herein. Once the initialization completes, the slave 200 can transmit the request data to the host 100 by means of the second HSIC module 20.

Referring to FIG. 6B, if a communication request is detected in the power-off state (L3), the host 100 sends an HSIC module activation request signal (Slave-Wakeup) to the slave 200 in step 631. For this purpose, the host 100 can enable the slave wakeup line (Slave-Wakeup). Upon receipt of the HSIC module activation request signal, the slave 200 sends a HSIC activation request signal (Host-Wakeup) to the host 100 in step 633. For this purpose, the slave 200 can enable the host wakeup line (Host-Wakeup). Upon receipt of the HSIC activation request signal, the host 100 turns on the power of the first HSIC module 10 to transition from the power-off state (L3) to the active state (L0) in step 635 and sends an HSIC activation request signal to the slave 200 in step 637. For this purpose, the host 100 can enable the host active line (Host-Active).

Upon receipt of the HSIC activation request signal, the slave 200 turns on the power of the second HSIC module 20 to transition from the power-off state (L3) to the active state (L0) in step 639. Once the second HSIC module 20 enters the active state (L0), the slave 200 can disable the host wakeup line (Host-Wakeup) in step 641. In addition, the host 100 can disable the slave wakeup line (Slave-Wakeup) in step 643.

Once both the first and second HSIC modules 10 and 20 power on, the first and second HSIC modules 10 and 20 perform the initialization process to establish a communication link according to the HSIC communication standard in step 645. After the initialization process completes, the host 100 can transmit the requested data to the slave 200 by means of the first HSIC module 10.

The above-described exemplary HSIC communication method of the present invention can be implemented in the form of computer-executable program commands and stored in a computer-readable storage medium. The computer readable storage medium can store the program commands, data files, and data structures in individual or combined forms. The program commands recorded in the storage medium can be designed and implemented for the present invention or used by those skilled in the computer software field.

The computer-readable storage medium includes a magnetic media, such as a floppy disk and a magnetic tape, an optical media including a Compact Disc (CD) Read Only Memory (ROM) and a Digital Video Disc (DVD) ROM, a magneto-optical media, such as a floptical disk, and the hardware device designed for storing and executing program commands, such as ROM, Random Access Memory (RAM), and flash memory. The program commands include the language code executable by computers using the interpreter as well as the machine language codes created by a compiler. The aforementioned hardware device can be implemented with one or more software modules for executing the operations of the present invention.

As described above, the exemplary HSIC communication system and method of the present invention controls the HSIC modules to transition to the suspend state when no data communication occurs over a predefined period in the active state and to the power-off state when no data communication occurs over a predefined time in the suspend state, resulting in minimization of power consumption of the HSIC communication system. In addition, the HSIC communication and method of the present invention is capable of reducing the rate of battery consumption of the mobile terminal adopting the improved HSIC communication system and method.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable communication device comprising:
    a first processor;
    a second processor; and
    a plurality of lines to communicatively connect between the first processor and the second processor, the plurality of lines including a first line to transfer a first control signal from the first processor to the second processor, a second line to transfer a second control signal from the second processor to the first processor and at least one third line to transfer data between the first processor and the second processor,
    wherein the first processor is configured to transmit the first control signal via the first line based at least in part on a communication request while the first processor is in a first non-active state and transition from the first non-active state to a first active state based at least in part on the second control signal received via the second line after the transmitting of the first control signal,
    wherein the second processor is configured to transmit the second control signal via the second line based at least in part on the first control signal while the second processor is in a second non-active state and transition from the second non-active state to a second active state after the first processor is in the first active state, and
    wherein the first processor and the second processor are further configured to communicate the data between each other via the at least one third line while the first processor is in the first active state and the second processor is in the second active state.

2. The portable communication device of claim 1, wherein the plurality of lines further includes a fourth line to transfer a suspend signal between the first processor and the second processor, and
    wherein the second processor is configured to:
        transmit a third control signal to the first processor via the second line based at least in part on the suspend signal received from the first processor via the fourth line, such that the first processor transitions from the first active state to the first non-active state based at least in part on the third control signal.

3. The portable communication device of claim 1, wherein the second processor is further configured to:
    transmit a third control signal to the first processor via the second line based at least in part on a determination that the data is not transmitted from the second processor to the first processor during a specified period of time, such that the first processor transitions from the first active state to the first non-active state based at least in part on the third control signal.

4. The portable communication device of claim 3, wherein the second processor is further configured to:
    identify inactivity time of the second processor, as at least part of the specified period of time.

5. The portable communication device of claim 3, wherein the first processor is further configured to:
    transmit a fourth control signal to the second processor via the first line after the first processor transitions from the first active state to the first non-active state such that the second processor transitions from the second active state to the second non-active state based at least in part on the fourth control signal.

6. The portable communication device of claim 5, wherein the first processor is further configured to:
    refrain from transmitting the fourth control signal via the first line based at least in part on a determination that the data is transmitted from the first processor to the second processor after the first processor transitions from the first active state to the first non-active state.

7. The portable communication device of claim 1, wherein the first processor and the second processor are further configured to:
    establish a connection between the first processor and the second processor via the at least one third line, after the first processor is transitioned to the first active state and the second processor is transitioned to the second active state.

8. The portable communication device of claim 1, wherein the first processor and the second processor are further configured to:
    identify, as the first control signal, a digital signal being changed from a low state to a high state on the first line, and
    identify, as the second control signal, another digital signal being changed from a low state to a high state on the second line.

9. The portable communication device of claim 1, wherein the first processor includes an application processor (AP) and the second processor includes a communication processor (CP).

10. The portable communication device of claim 1,
    wherein the first line includes a slave wake-up line or a second wake-up line of a serial interface, and
    wherein the second line includes a host wake-up line or a first wake-up line of the serial interface.

11. A method of operating a portable communication device including a first processor and a second processor communicatively coupled with the first processor via a plurality of lines including a first line to transfer a first control signal from the first processor to the second processor, a second line to transfer a second control signal from the second processor to the first processor and at least one third line to transfer data between the first processor and the second processor, the method comprising:
    enabling, at the first processor, the first control signal with respect to the second processor via the first line based at least in part on a communication request;

enabling, at the second processor, the second control signal with respect to the first processor via the second line based at least in part on the enabled first control signal;

activating the first processor based at least in part on the enabled second control signal;

activating the second processor based at least in part on the activating of the first processor; and communicating the data between the first processor and the second processor via the at least one third line while the first processor and the second processor are activated.

12. The method of claim 11, further comprising:

disabling, at the second processor, the second control signal via the second line based at least in part on a determination that the data is not transmitted from the second processor to the first processor during a specified period of time; and deactivating the first processor based at least in part on the disabled second control signal.

13. The method of claim 12, wherein the disabling of the second control signal comprises:

identifying, at the second processor, inactivity time of the second processor, as at least part of the specified period of time.

14. The method of claim 12, further comprising:

disabling, at the first processor, the first control signal via the first line after the deactivating the first processor; and deactivating the second processor based at least in part on the disabled first control signal.

15. The method of claim 14, further comprising:

refraining, at the first processor, from disabling the first control signal via the first line based at least in part on a determination that the data is transmitted from the first processor to the second processor after the deactivating the first processor.

16. The method of claim 11, wherein the communicating comprises:

establishing a connection between the first processor and the second processor via the at least one third line.

17. The method of claim 11, wherein the enabling the first control signal and the second control signal comprises:

identifying, as the first control signal, a digital signal being changed from a low state to a high state on the first line; and identifying, as the second control signal, another digital signal being changed from a low state to a high state on the second line.

18. A portable communication device comprising:
an application processor;
a communication processor; and
a serial interface configured to communicatively connect the application processor and the communication processor, the serial interface including a first line corresponding to a first control signal from the application processor to the communication processor, a second line corresponding to a second control signal from the communication processor to the application processor and at least one third line corresponding to data transferred between the application processor and the communication processor, wherein the application processor is configured to transmit the first control signal via the first line based at least in part on a communication request while the application processor is in a first non-active state and transition from the first non-active state to a first active state based at least in part on the second control signal received via the second line after the transmitting of the first control signal, wherein the communication processor is configured to transmit the second control signal via the second line based at least in part on the first control signal while the communication processor is in a second non-active state and transition from the second non-active state to a second active state after the application processor is in the first active state, and wherein the application processor and the communication processor are further configured to communicate the data between each other via the at least one third line while the application processor is in the first active state and the communication processor is in the second active state.

19. The portable communication device of claim 18, wherein the communication processor is further configured to:

transmit a third control signal to the application processor via the second line based at least in part on a determination that the data is not transmitted from the communication processor to the application processor during a specified period of time, such that the application processor transitions from the first active state to the first non-active state based at least in part on the third control signal.

20. The portable communication device of claim 19, wherein the application processor and the communication processor are further configured to:

identify a mobile industry processor interface (MIPI), a high speed inter chip (HSIC) interface, a universal serial bus (USB) interface, a peripheral component interconnect express (PCIe) interface, or any combination thereof, as at least part of the serial interface.

* * * * *